(12) United States Patent
Reimer et al.

(10) Patent No.: US 10,523,362 B2
(45) Date of Patent: Dec. 31, 2019

(54) SYSTEMS AND METHODS FOR ERROR-FREE RECONSTRUCTION OF TRANSMITTED SYMBOLS IN A COHERENT RECEIVER

(71) Applicant: Ciena Corporation, Hanover, MD (US)

(72) Inventors: Michael Andrew Reimer, Stittsville (CA); Qunbi Zhuge, Kanata (CA); Manoj Verghese, Ottawa (CA); Hamid Ebrahimzad, Ottawa (CA); Maurice O'Sullivan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 73 days.

(21) Appl. No.: 15/845,045

(22) Filed: Dec. 18, 2017

(65) Prior Publication Data

US 2019/0190648 A1    Jun. 20, 2019

(51) Int. Cl.
*H04L 1/00* (2006.01)
*H04B 10/2513* (2013.01)
*H04B 10/532* (2013.01)
*H04L 27/34* (2006.01)
*H04B 10/2543* (2013.01)
(Continued)

(52) U.S. Cl.
CPC ....... *H04L 1/0041* (2013.01); *H04B 10/2543* (2013.01); *H04B 10/25137* (2013.01); *H04B 10/532* (2013.01); *H04L 1/242* (2013.01); *H04L 27/3405* (2013.01); *H04B 10/588* (2013.01); *H04B 2210/254* (2013.01); *H04J 14/0221* (2013.01)

(58) Field of Classification Search
CPC .............. H04L 1/0041; H04L 27/3405; H04B 10/25137; H04B 10/2543; H04B 10/532; H04B 10/588; H04B 2210/254; H04J 14/0221
See application file for complete search history.

(56) References Cited

U.S. PATENT DOCUMENTS 6,424,678 B1 * 7/2002 Doberstein ........... H04L 5/0005
                                                              370/510
7,756,421 B2    7/2010 Roberts et al.
(Continued)

OTHER PUBLICATIONS

Qunbi Zhuge, Advanced Technologies for Next Generation Coherent Optical Communications, Department of Electrical & Computer Engineering, McGill University, Montreal, Canada, Dec. 2014, pp. 1-188.
(Continued)

*Primary Examiner* — Guy J Lamarre
(74) *Attorney, Agent, or Firm* — Clements Bernard Walker; Christopher L. Bernard; Lawrence A. Baratta, Jr.

(57) ABSTRACT

Systems and methods for estimating a transmit symbol sequence implemented in a coherent receiver include receiving a nominally error-free information bit sequence subsequent to Forward Error Correction (FEC) decoding; determining a nominally error-free estimate of the transmitted bit sequence based on the nominally error-free information bit sequence; and determining a nominally error-free estimate of the transmit symbol sequence by mapping the transmit bit sequence to transmit symbols. The system and methods can further include comparing a transmit optical field based on the transmit symbols to a received optical field for one or more measurements.

20 Claims, 5 Drawing Sheets

(51) Int. Cl.
    *H04L 1/24*     (2006.01)
    *H04J 14/02*    (2006.01)
    *H04B 10/588*   (2013.01)

(56) References Cited

U.S. PATENT DOCUMENTS

| | | |
|---|---|---|
| 8,249,467 B2 | 8/2012 | Roberts et al. |
| 8,787,754 B1 | 7/2014 | Beckett et al. |
| 9,240,843 B1* | 1/2016 | Malouin ............... H04B 10/616 |
| 2007/0153925 A1* | 7/2007 | Yang ..................... H04L 1/0009 |
| | | 375/260 |
| 2012/0148262 A1 | 6/2012 | Awadalla et al. |
| 2013/0063796 A1* | 3/2013 | Belicofski .............. G03H 1/265 |
| | | 359/22 |
| 2014/0133865 A1 | 5/2014 | Remier et al. |
| 2015/0071652 A1 | 3/2015 | Zhuge et al. |
| 2015/0195045 A1 | 7/2015 | Zhuge et al. |
| 2016/0072657 A1* | 3/2016 | Vojcic .................... H04L 1/005 |
| | | 375/260 |
| 2016/0344482 A1 | 11/2016 | Zhuge et al. |
| 2016/0373190 A1 | 12/2016 | Remier et al. |
| 2017/0310390 A1 | 10/2017 | Shiner et al. |

OTHER PUBLICATIONS

Qunbi Zhuge et al., Aggressive Quantization on Perturbation Coefficients for Nonlinear Pre-Distortion, pp. 1-3.

Qunbi Zhuge et al., Flexible Modulation and Nonlinear Tolerance for Coherent Transceivers, pp. 1-3.

Michael Andrew Reimer, Simulation Methods for the Temporal and Frequency Dynamics of Optical Communication Systems, Waterloo, Ontario, Canada, 2012, pp. 1-199.

* cited by examiner

SYSTEMS AND METHODS FOR ERROR-FREE RECONSTRUCTION OF TRANSMITTED SYMBOLS IN A COHERENT RECEIVER

FIELD OF THE DISCLOSURE

The present disclosure generally relates to optical networking systems and methods. More particularly, the present disclosure relates to systems and methods for the error-free reconstruction of transmitted symbols in a coherent receiver for real-time measurements, such as for a coherent optical receiver.

BACKGROUND OF THE DISCLOSURE

Coherent optical transmission uses modulation of the amplitude and phase of light, as well as transmission on two polarizations, to enable the transport of considerably more information through a fiber optic cable by transmitting multiple bits per symbol. Optical transceivers further utilize advanced signal processing techniques to perform various functions including dispersion mitigation and the like. Further, optical transceivers utilize advanced Forward Error Correction (FEC) schemes to provide additional reach and/or capacity. In operation, there are various real-time measurements that may be performed such as, for example, measurement of the Optical Signal-to-Noise Ratio (OSNR), Polarization Mode Dispersion (PMD), Polarization Dependent Loss (PDL) and the like. These various real-time measurements can be performed at an optical receiver based in part on comparing the transmitted signal with the received signal. Of course, the optical receiver does not know the actual transmitted signal, i.e., symbols and the sequence thereof. Conventionally, the optical receiver can reconstruct the transmitted signal based on hard or soft decision estimates of the received bits prior to FEC decoding. However, this reconstruction is merely an estimate of the transmitted signal and using such an estimate of the transmitted signal for the real-time measurements is imprecise and prone to errors. For example, an optical transceiver can have symbol error rates on the order of 30-40% leading to significant discrepancies between the estimated transmitted signal and the actual transmitted signal. Alternatively, training symbols may be sent periodically. Training symbols are known to the receiver a priori and as such don't convey sent information. They do, however, consume channel bandwidth resources. As a result, use of training symbols reduces the amount of information that can be sent in a given time interval.

BRIEF SUMMARY OF THE DISCLOSURE

In an embodiment, a method for estimating a transmit symbol sequence implemented in a coherent receiver includes receiving a nominally error-free information bit sequence subsequent to Forward Error Correction (FEC) decoding; determining a nominally error-free estimate of the transmitted bit sequence based on the nominally error-free information bit sequence; and determining a nominally error-free estimate of the transmit symbol sequence by mapping the transmit bit sequence to transmit symbols. The method can further include comparing a transmit optical field based on the transmit symbols to a received optical field for one or more measurements. The comparison can estimate signal impairments originating in one or more of a coherent transmitter, the coherent receiver, and an optical channel between the coherent transmitter and the coherent receiver. The cause of the impairment can be localized within one or more of the coherent transmitter, the coherent receiver, and the optical channel between the coherent transmitter and the coherent receiver. The determination of the nominally error-free estimate of the transmitted bit sequence can include reinserting overhead bits associated with the FEC decoding into the error-free information bit sequence. The overhead bits can be determined based on connectivity from an FEC decoding block which provides the overhead bits. The overhead bits can be determined on re-computing the overhead bits from the transmitted bit sequence. The determination of the nominally error-free estimate of the transmitted bit sequence can include a temporal reordering of the nominally error-free information bit sequence as an inverse of any bit interleaving at a corresponding transmitter. The estimation can be applied to a portion of an input to the coherent receiver to periodically monitor a plurality of symbols for one or more measurements. The method can further include utilizing the nominally error-free estimate of the transmit symbol sequence to determine nonlinear C-matrices which characterize Kerr nonlinearity developed during fiber propagation. The method can further include utilizing the nominally error-free estimate of the transmit symbol sequence to determine effective Polarization Dependent Loss (PDL) for link performance monitoring.

In another embodiment, an apparatus configured to estimate a transmit symbol sequence implemented in a coherent receiver includes circuitry configured to receive a nominally error-free information bit sequence subsequent to Forward Error Correction (FEC) decoding; circuitry configured to determine a nominally error-free estimate of the transmitted bit sequence based on the nominally error-free information bit sequence; and circuitry configured to determine a nominally error-free estimate of the transmit symbol sequence by mapping the transmit bit sequence to transmit symbols. The apparatus can further include circuitry configured to compare a transmit optical field based on the transmit symbols to a received optical field for one or more measurements. The circuitry configured to compare can estimate signal impairments originating in one or more of a coherent transmitter, the coherent receiver, and an optical channel between the coherent transmitter and the coherent receiver. The cause of the impairment can be localized within one or more of a coherent transmitter, the coherent receiver, and the optical channel between the coherent transmitter and the coherent receiver. The circuitry configured to determine the nominally error-free estimate of the transmitted bit sequence can be configured to reinsert overhead bits associated with the FEC decoding into the error-free information bit sequence. The overhead bits can be provided from an FEC decoding block which performs the FEC decoding. The circuitry configured to determine the nominally error-free estimate of the transmitted bit sequence can be configured to re-compute the overhead bits based on the transmitted bit sequence. The circuitry configured to determine the nominally error-free estimate of the transmitted bit sequence can be configured to temporally reorder the nominally error-free information bit sequence as an inverse of any bit interleaving at a corresponding transmitter.

In a further embodiment, a coherent receiver configured to estimate a transmit symbol sequence includes a Forward Error Correction (FEC) decoding block configured to decode an input to provide a nominally error-free information bit sequence; an inverse de-interleaver configured to reorder the nominally error-free information bit sequence to provide a nominally error-free estimate of the transmitted bit sequence; and a bit-to-symbol mapping block configured to map the transmitted bit sequence to transmit symbols.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to systems and methods for the error-free reconstruction of transmitted symbols in a coherent receiver for real-time measurements, such as with a coherent optical receiver. Advantageously, the systems and methods provide a nominally error-free version of the transmit symbols local to the coherent optical receiver by passively monitoring decoded data bits and any additional overhead bits in real-time at the output of FEC (referred to here as bit "sniffing"), with the coherent optical receiver operating in its normal mode and without additional transmission overhead. The systems and methods require minimal additional hardware as the error-free reconstruction involves a temporal reordering process to rearrange the decoded data bits along with associated overhead/parity bits inversely to the temporal interleaving at a corresponding transmitter, and a bit-to-symbol mapping which converts the temporally reordered bits into symbols representing the transmitted optical signal. The overhead/parity bits can be obtained either by sniffing the output of the FEC decoding block or by re-computing the overhead/parity based on the decoded data bits.

Next generation coherent optical transceivers are expected to provide real-time measurement of physical link conditions and signal quality in order to achieve flexible network-level optimization. For example, estimates of the OSNR and signal to noise ratio due to nonlinear interference (NL-SNR) developed from the measurement of the distribution of received optical symbols can be incorporated into power control algorithms for maximizing network capacity. As another example, measurement of the temporal correlation statistics of nonlinear interference can be used to train receive circuitry (e.g., Application Specific Integrated Circuit (ASIC) Digital Signal Processing (DSP)), such as carrier phase recovery, for best effect.

Such measurements implicitly assume that a suitable estimate of the transmit optical symbols is known and available to the coherent receiver to act as a reference from which various propagation impairments can be derived. Again, typically, the transmit symbols are estimated by simply locating the closest valid constellation point to each of the received symbols, a procedure referred to as hard decision decoding. Of course, these hard decisions result in erroneous estimates whenever a received symbol happens to be decoded incorrectly which, in turn, leads to a propagation of random decision errors into system measurements. Since next-generation coherent modems are expected to operate at high symbol error rates due to improved forward error correction, the impact of decision errors on system measurement accuracy becomes more pronounced. Alternatively, training symbols may be sent periodically. Training symbols are known to the receiver a priori and as such don't convey sent information. They do, however, consume channel bandwidth resources. As a result, use of training symbols reduces the amount of information that can be sent in a given time interval.

To provide a specific example, in a linear system dominated by Amplified Spontaneous Emission (ASE), a received optical symbol, represented by the optical field vector $\vec{r}=[r_x, r_y]^T$, is related to the transmit optical symbol $\vec{s}=[s_x, s_y]^T$ through $$\vec{r} = \vec{s} + \vec{n}$$

where $\vec{n}=[n_x, n_y]^T$ is a vector of Additive White Gaussian Noise (AWGN), the superscript T denotes a transpose, and the subscripts x and y denote the X- and Y-polarizations. The Signal to Noise Ratio (SNR) is then given by the ratio of the energy of the signal to the energy of the noise, $SNR=E\{|\vec{s}|^2\}/E\{|\vec{n}|^2\}$, where $E\{\ldots\}$ is the expected value. One obvious technique for measuring the noise is to simply subtract the estimate of the transmit symbols, $\vec{s}_{est}$, from the received symbols, such that $\vec{n}_{est} \approx \vec{r} - \vec{s}_{est}$, where $\vec{s}_{est}$ is obtained from hard decision decoding of $\vec{r}$ and $\vec{r}_{est}$ is the estimated noise vector. The estimated SNR is taken to be $SNR_{est}=E\{|\vec{s}_{est}|^2\}/E\{|\vec{n}_{est}|^2\}$. Due to decision errors, however, there is an error between the estimated and actual SNR, which can lead to suboptimal optimization in higher layers of network control.

Figure 1A:
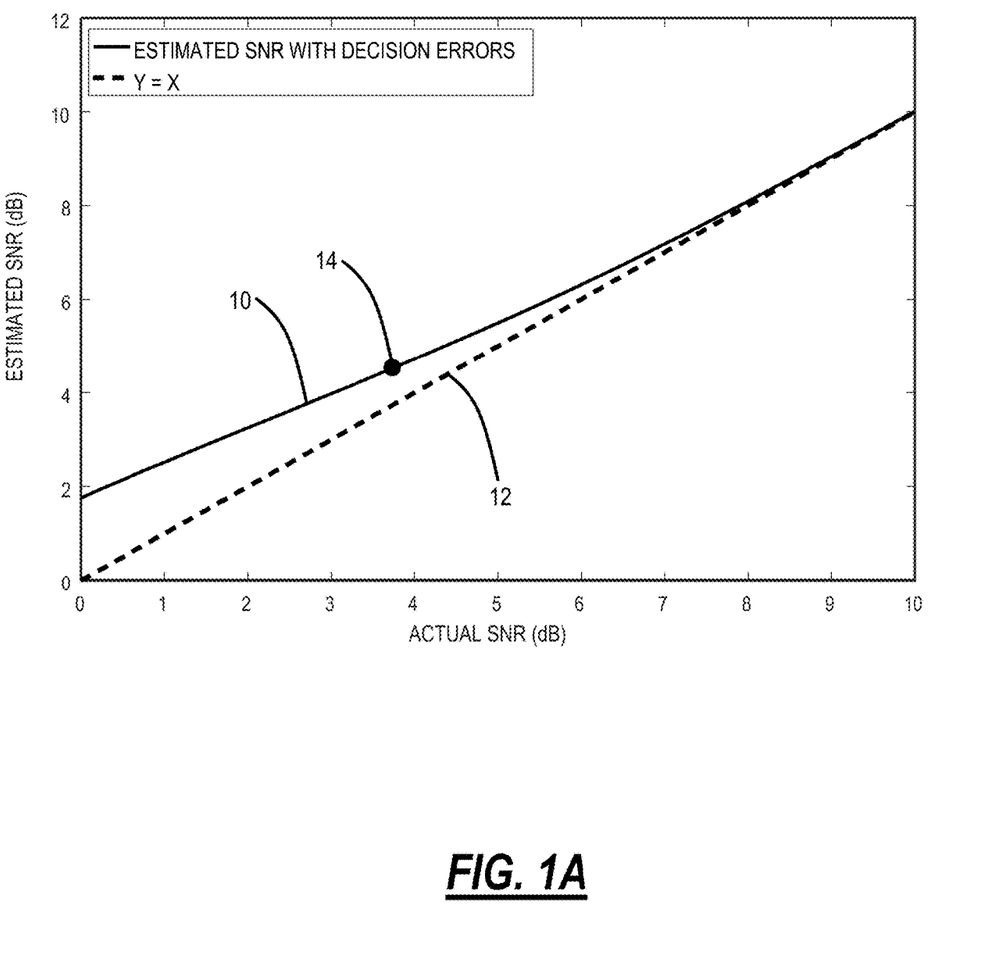
FIG. 1A is a graph of the error between the estimated and actual Signal to Noise Ratio (SNR) due to decision errors by plotting the estimated SNR versus the actual SNR for a Dual-Polarization Quadrature Phase Shift Keying (DP-QPSK) signal in a linear Additive White Gaussian Noise (AWGN) channel.

FIG. 1A is a graph of the error between the estimated and actual SNR due to decision errors plotting the estimated SNR versus the actual SNR for a Dual-Polarization Quadrature Phase Shift Keying (DP-QPSK) signal in a linear AWGN channel. The graph includes a line 10 of the estimated SNR with decision errors which is compared to the actual SNR which is shown in a line 12 (which is y=x since the graph is a plot of estimated SNR versus actual SNR and when the estimated SNR=actual SNR, the plot is y=x). At a 3.74 dB SNR, typically tolerated by a next-generation coherent receiver (denoted by a point 14 on the line 10), there is a ~0.8 dB offset observed between the estimated SNR and the actual SNR, with the error increasing at lower SNRs. Analogous measurements of the NL-SNR, nonlinear phase noise, and nonlinear temporal correlations are similarly impacted by receive decision errors.

In another example, the error-free reconstruction of the transmit symbol sequence may be used to improve the measurement of NL-SNR by improving the estimate of a nonlinear "C-matrix" characterizing the Kerr nonlinearity developed during fiber propagation. The Kerr effect is a third-order nonlinearity. Three fields (separated in time, or separated in frequency) interact to produce a fourth field. The Kerr effect is referred to as intra-channel Kerr nonlinear noise in cases where the three interacting fields are within a channel and the resulting fourth field is also within that same channel. The Kerr effect is referred to as inter-channel Kerr nonlinear noise in cases where the three interacting fields are between different channels (that is, one interacting field is from one channel and two interacting fields are from another channel, or each interacting field is from a different channel) and in cases where the three interacting fields are from one channel and the resulting fourth field is in a different channel.

With respect to characterizing a channel and optionally, for determining nonlinear noise, a coherent optical receiver isolates a noise component of a received signal. As described in more detail below, the noise component may be isolated from the received symbols and estimated transmitted symbols, or from the received symbols and training symbols. The coherent optical receiver can determine C-matrices and doublet correlations that characterize how the Kerr effect is manifested in a channel. The C-matrices and doublet correlations, which are described in more detail below, are determined using the nonlinear noise component that was isolated using received symbols or training symbols or estimated transmitted symbols. Correction of systematic errors are also described. Optionally, the coherent optical receiver uses the C-matrices and doublet correlations determined to calculate an estimated intra-channel noise-to-signal ratio (NSR) and to calculate a total nonlinear NSR. Optionally, the coherent optical receiver estimates a linear NSR (also known as the optical NSR) as the difference between the isolated noise and the total nonlinear NSR.

Isolation of the noise component assumes that nonlinear noise is a small perturbation of the otherwise linear transmit signal:

$$A' = A + \Delta A \quad (1)$$

where $A = [A_X, A_Y]^T$ is the dual-polarization transmitted signal, $A' = [A_X', A_Y']^T$ is the dual-polarization received signal, and $\Delta A = [\Delta A_X, \Delta A_Y]^T$ is the nonlinear noise component of the received signal. A, A', and $\Delta A$ are functions of time t and distance z. Other noise, including linear noise and transceiver internal noise, is ignored in equation (1).

Based on perturbation theory, the nonlinear Schrödinger equation can be expressed as $$\frac{\partial \Delta A}{\partial z} - \frac{i\beta_2}{2} \frac{\partial^2 \Delta A}{\partial t^2} + \frac{\alpha}{2} \Delta A = -i\gamma |A|^2 A \quad (2)$$

where $\beta_2$ is a second order dispersion coefficient, $\gamma$ is the fiber nonlinear coefficient, and $\alpha$ is an attenuation coefficient of the optical power.

For Intra-channel Kerr nonlinear noise, with dual-polarization signals (say, an X-polarization and a Y-polarization), an approximate solution of the intra-channel Kerr nonlinear noise component for each polarization can be derived based on equation (2) as $$\Delta A_X[k] = \sum_{m,n} C_X[m,n] A_X[k+m] A_X[k+n] A_X^*[k+m+n] + \quad (3)$$

$$\sum_{m,n} C_{XY}[m,n] A_X[k+m] A_Y[k+n] A_Y^*[k+m+n]$$

-continued $$\Delta A_Y[k] = \sum_{m,n} C_Y[m,n] A_Y[k+m] A_Y[k+n] A_Y^*[k+m+n] + \quad (4)$$

$$\sum_{m,n} C_{YX}[m,n] A_Y[k+m] A_X[k+n] A_X^*[k+m+n]$$

where $\Delta A_X[k]$ is the nonlinear noise component indexed by k for the X-polarization, $\Delta A_Y[k]$ is the nonlinear noise component indexed by k for the Y-polarization, $A_X[k]$ is the transmitted symbol indexed by k for the X-polarization, $A_Y[k]$ is the transmitted symbol indexed by k for the Y-polarization, and the asterisk (*) denotes conjugation. $A_{X\,or\,Y}[k]$ is a sampled version of $A_{X\,or\,Y}$ in equations (1) and (2), and $\Delta A_{X\,or\,Y}[k]$ is a sampled version of $\Delta A_{X\,or\,Y}$ in equations (1) and (2).

As mentioned above, in the Kerr effect, three fields (separated in time, or separated in frequency) interact to produce a fourth field. Thus, the summations in equations (3) and (4) involve triplets of symbols: a symbol indexed by k+m, a symbol indexed by k+n, and a symbol indexed by k+m+n. The triplet is represented by the shorthand (k,m,n,m+n).

In the time domain, the three interacting fields may be represented with $A[k] = A(k \cdot \Delta t)$ where $\Delta t$ is the sample duration, and the corresponding C-matrices may be in the time domain.

In the frequency domain, the three interacting fields may be represented with $A[k] = \tilde{A}(k \cdot \Delta f)$, where $\tilde{A}(f)$ is the Fourier transform of A(t) and $\Delta f$ is the frequency spacing, and the corresponding C-matrices may be in the frequency domain.

In the symbol domain, the three interacting fields may be represented with $A[k] = A(k \cdot T)$ where T denotes the symbol duration, and the corresponding C-matrices may be in the symbol domain.

The indices m and n can take on negative values, zero values and positive values. For example, the sequence $A_X[-2]$, $A_X[-1]$, $A_X[0]$, $A_X[1]$, $A_X[2]$ represents five consecutively transmitted symbols for the X polarization. The contribution of the nonlinear intra-channel interaction between $A_X[-1]$, $A_X[1]$, and $A_X[2]$ to the intra-channel Kerr nonlinear noise for the X polarization, $\Delta A_X[0]$, is given by $C_X[-1,2] A_X[-1] A_X[2] A_X^*[1]$.

The coefficients $C_X[m, n]$, $C_Y[m, n]$, $C_{XY}[m, n]$, and $C_{YX}[m, n]$ appearing in equations (3) and (4) form four separate C-matrices $C_X$, $C_Y$, $C_{XY}$, and $C_{YX}$, respectively, that characterize how the Kerr effect is manifested in the channel over which the symbols have been transmitted and received. That is, the C-matrices $C_X$, $C_Y$, $C_{XY}$, and $C_{YX}$ characterize the fourth field that is produced by the Kerr effect. In the absence of polarization effects, the C-matrices $C_X$, $C_Y$, $C_{XY}$, and $C_{YX}$ are identical to each other.

Assuming the power of symbols is normalized, the C-matrices can be estimated by evaluating the cross-correlation between the intra-channel noise component and the fields of each (k,m,n,m+n) triplet, and taking into account the correlation between the triplets.

The C-matrices $C_X[m, n]$ and $C_{XY}[m, n]$ can be evaluated as follows:

$$C_X'[m,n] = E[\Delta A_X[k] \cdot A_X^*[k+m] \cdot A_X^*[k+n] \cdot A_X[k+m+n]] \quad (5)$$

$$C_{XY}'[m,n] = E[\Delta A_X[k] \cdot A_X^*[k+m] \cdot A_Y^*[k+n] \cdot A_Y[k+m+n]] \quad (6)$$

$$Q_X[k,m,n] = A_X[k+m] \cdot A_X[k+n] \cdot A_X^*[k+m+n] \quad (7)$$

$$Q_{XY}[k,m,n] = A_X[k+m] \cdot A_Y[k+n] \cdot A_Y^*[k+m+n] \quad (8)$$

$$\vec{C}_X' = \text{vec}(C_X'([m,n]), C_{XY}'[m,n]) \quad (9)$$

$$\vec{Q}_X = \text{vec}(Q_X[k,m,n], Q_{XY}[k,m,n]) \quad (10)$$

$$R_X = E[\vec{Q}_X \vec{Q}_X^H] \quad (11)$$

$$\vec{C}_X = \vec{C}_X' \text{inv}(R_X) \quad (12)$$

$$(C_X[m,n], C_{XY}[m,n]) = \text{vec}^{-1}(\vec{C}_X) \quad (13)$$

where vec(•) is a function that converts the matrices to a single vector with a certain order of all elements, $\text{vec}^{-1}(\bullet)$ is the inverse operation of vec(•), and inv(•) is inverse of a matrix.

The C-matrices $C_Y[m, n]$ and $C_{YX}[m, n]$ can be evaluated as follows:

$$C_Y'[m,n] = E[\Delta A_Y[k] \cdot A_Y[k+m] \cdot A_Y^*[k+n] \cdot A_Y[k+m+n]] \quad (14)$$

$$C_{YX}'[m,n] = E[\Delta A_Y[k] \cdot A_Y^*[k+m] \cdot A_X^*[k+n] \cdot A_X[k+m+n]] \quad (15)$$

$$Q_Y[k,m,n] = A_Y[k+m] \cdot A_Y[k+n] \cdot A_Y^*[k+m+n] \quad (16)$$

$$Q_{YX}[k,m,n] = A_Y[k+m] \cdot A_X[k+n] \cdot A_X^*[k+m+n] \quad (17)$$

$$\vec{C}_Y' = \text{vec}(C_Y'[m,n], C_{YX}'[m,n]) \quad (18)$$

$$\vec{Q}_Y = \text{vec}(Q_Y[k,m,n], Q_{YX}[k,m,n]) \quad (19)$$

$$R_Y = E[\vec{Q}_Y \vec{Q}_Y^H] \quad (20)$$

$$\vec{C}_Y = \vec{C}_Y' \text{inv}(R_Y) \quad (21)$$

$$(C_Y[m,n], C_{YX}[m,n]) = \text{vec}^{-1}(\vec{C}_Y) \quad (22)$$

where vec(•) is a function that convert the matrices to a single vector with a certain order of all elements, $\text{vec}^{-1}(\bullet)$ is the inverse operation of vec(•), and inv(•) is inverse of a matrix.

In equations (5), (6), (11), (14), (15) and (20), E is an expectation, which is a weighted average. In equations (3) through (22), the transmit symbols typically represent hard decision estimates of the received symbols (or a sufficiently long record of training symbols), while in the present invention the transmit symbols in equations (3) through (22) represent the error-free reconstruction of the transmit symbol sequence by monitoring the FEC output. In this manner, the systems and methods can use the error-free reconstruction of the transmit symbols to reduce the time required to estimate the nonlinear C-matrices by a factor of ~10, since error propagation using hard decision estimates during the averaging, E, is eliminated. Conversely, for the same total averaging time, the accuracy of the C-matrix estimate may be improved by a factor of roughly $\sqrt{10} \approx 3$.

In another embodiment, the error-free reconstruction of the transmit symbol sequence can improve the measurement of Polarization Dependent Loss (PDL) within the coherent receiver. Each polarization of a polarization-multiplexed coherent signal may experience different loss during transmission, referred to as PDL, leading to both a degradation of the OSNR on each polarization and increased symbol error rate due to reduced Euclidean distance between received symbols. PDL also varies in time on time scales ranging from sub-millisecond to several hours depending upon the physical characteristics of the system. Real time measurement of PDL within the coherent receiver is then critical not only for diagnostics of transmission performance but also for planned network level control where capacity may be allocated dynamically depending upon the current instance of PDL. For example, capacity could be switched away from a channel experiencing a high PDL event to another channel with tolerable PDL.

PDL measurement in typical coherent receivers may be complicated by Electronic Gain Control (EGC) applied to the analog electrical signal prior to analog-to-digital conversion (ADC). The intent of this EGC is to maintain constant power on each of the four tributaries of the input optical field, i.e., the real and imaginary parts of the X-polarization together with the real and imaginary parts of the Y-polarization, to prepare the signal at the ADC input to minimize the noise and distortion added by the ADC. Since PDL causes each polarization to have a different optical power, the EGC responds by applying a compensating gain to equalize this power difference. All subsequent DSP blocks then experience and respond to the combined link PDL plus EGC response. However, the receive bit-error-rate (BER) depends mainly upon the PDL encountered during optical fiber propagation, not the combined PDL+EGC response.

For example, if the orientation of the link PDL happens to be at 45 degrees relative to the X- and Y-polarizations of the coherent receiver, the optical power will be equal on each of the X- and Y-polarizations and the EGC has no effect. In this case, the coherent receiver measures a PDL equal to the link PDL as desired. However, if the orientation of the link PDL happens to be aligned with the X- and Y-polarizations, the EGC will apply a gain equal to the inverse of the PDL loss, and the coherent receiver will measure a PDL of 0 dB. Nevertheless, the receive BER in this case will be higher than expected for a measured PDL of 0 dB. As this example highlights, due to the action of the EGC the magnitude of the receiver-reported PDL varies from 0 dB to the actual value of the link PDL depending upon the polarization orientation relative to the coherent receiver. This behavior is undesirable for accurate measurement and characterization of link PDL.

If the EGC gains are monitored and reported to firmware, an appropriate correction can be applied to the card-reported PDL to provide an accurate estimate of the actual link PDL. While this approach works in principle, in practice the EGC gains are typically controlled by an onboard ARM processor and are asynchronous to PDL measurements. The degree of asynchrony corrupts the PDL estimate correction for faster changing channels where the EGC gain value is stale in the instant of the PDL estimate. Synchronization is more straightforward if the channel varies slowly in time.

Figure 1B:
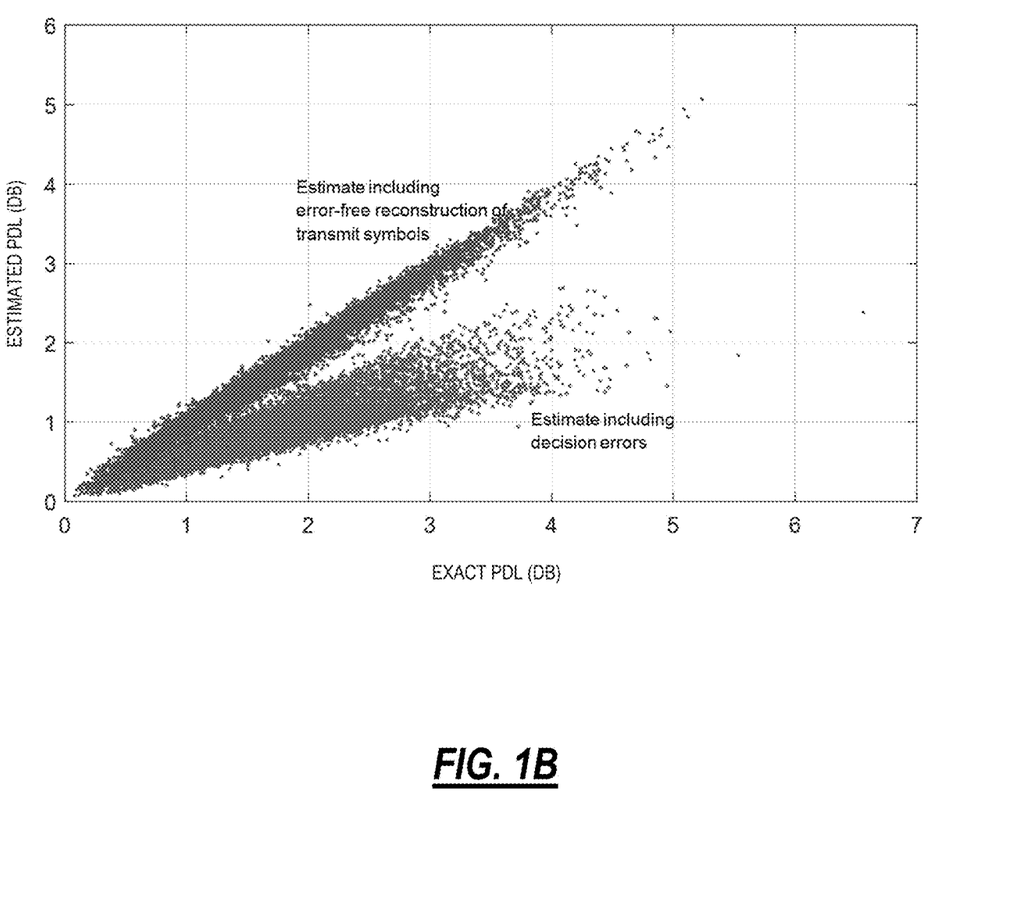
FIG. 1B a graph of the estimated PDL in dB versus the exact PDL in dB with data points shown for an estimate including decision errors and an estimated including the error-free reconstruction of the transmit symbols described herein.

The systems and methods include a process for measuring an "effective PDL" that is independent of EGC gains and that has a high degree of correlation with the receive BER to make it suitable for link performance monitoring As an example, this effective PDL is suitable for monitoring the degradation of signal quality. The process significantly improves the accuracy a PDL measurement when combined with the error-free reconstruction of the transmit symbol sequence, while providing a PDL measure that is independent of the EGC response. FIG. 1B is a graph of the estimated PDL in dB versus the exact PDL in dB with data points shown for an estimate including decision errors and an estimate including the error-free reconstruction of the transmit symbols described herein.

Coherent receivers often apply a 2-by-2 whitening matrix, W, to the received optical symbols prior to detection to provide improved performance in the presence of PDL. Since the noise experienced on different polarizations may have different power depending on the instance of PDL, the whitening matrix Wacts to transform the signal and noise so as to "whiten" the noise such that the resulting, transformed noise is uncorrelated and has equal variance between polarizations. That is, the covariance matrix of the transformed noise is proportional to the identity matrix. Further, since PDL may cause systematic distortion to the received symbols, coherent receivers often employ "constellation learning" in which the average of the systematic distortion is determined over received symbols. Optical symbols are then decoded relative to the averaged "learned constellation", $C_L$, as opposed to the original ideal constellation encoded in the transmitter. As an example, in the absence of frequency-dependent polarization mode dispersion, the received optical field vector $\vec{r} = [r_x, r_y]^T$ may be expressed as $$\vec{r} = LG(H_{sig}\vec{s} + H_{nse}\vec{n})$$

where $\vec{s} = [s_x, s_y]^T$ is the transmit symbol, if, $\vec{n} = [n_x, n_y]^T$ is additive noise, L is a 2-by-2 matrix describing the response of the receive equalizer (e.g. least mean square (LMS) equalizer), G is a 2-by-2 diagonal matrix describing the EGC gain applied to each polarization, $H_{sig}$ is a 2-by-2 matrix describing the PDL experienced by the transmit symbol, and $H_{nse}$ is a 2-by-2 matrix describing the cumulative PDL experienced by the noise. In general, the matrices $H_{sig}$ and $H_{nse}$ are different in standard optical communication systems with periodic optical amplification. After applying noise whitening, the transformed received symbols are $$\vec{r}_w = W\vec{r} = WLG(H_{sig}\vec{s} + H_{nse}\vec{n})$$

in which W is chosen such that the product $Q = WLGH_{nse}$ is unitary with $QQ^H = I$. Here, the superscript H denotes the Hermitian conjugate while I is the 2-by-2 identity matrix. Without loss of generality, it is useful to select $W = H_{nse}^{-1} G^{-1} L^{-1}$ such that $Q = I$ and $$\vec{r}_w = H_{nse}^{-1} H_{sig} \vec{s} + \vec{n} = H_{eff} \vec{s} + \vec{n}.$$

The matrix $H_{eff} = H_{nse}^{-1} H_{sig}$ will be referred to as the "effective" PDL matrix experienced by transmit symbols after noise whitening. Notice that $H_{eff}$ is independent of both the EGC and LMS response, G and L, respectively. Further, constellation learning when combined with a nominally error-free estimate of the transmit symbols provides a useful method for determining this effective PDL matrix.

Notice that for the typical case in which the transmit symbols $\vec{s}$ are selected as elements of an ideal constellation $\vec{C}_{tx}$ containing M possible symbol outcomes, $\vec{C}_{tx}[1]$, $\vec{C}_{tx}[2]$, ..., $\vec{C}_{tx}[M]$ (for example, dual polarization quadrature phase shift keyed (DP-QPSK) or dual polarization 16 quadrature amplitude modulation (DP-16QAM) constellations), then the "learned", or averaged, constellation at the receiver may be calculated by averaging all instances of $\vec{r}_w$, for which $\vec{s}$ is equal to a particular $\vec{C}_{tx}[k]$, k=1, 2 ..., M. That is, the k:th element of the learned constellation $\vec{C}_L$ may be calculated based on the conditional expectation $$\vec{C}_L[k] = E\{\vec{r}_w | \vec{s} = \vec{C}_{tx}[k]\}$$

Since the vector $\vec{s}$ is unknown at the receiver in standard DSP implementations, a hard decision estimate $\vec{s}_{est}$ of the transmit symbol is typically used in the evaluation of $\vec{C}_L$. However, using the methods of the present invention, the nominally error-free estimate of the transmit symbols may be used within the conditional expectation to remove the impact of symbol decision errors, thereby reducing the time required to develop a sufficiently accurate estimate of $\vec{C}_L$ by a factor of ~10.

In the present example, the learned constellation after whitening may be written as $$\vec{C}_L = H_{eff}\vec{C}_{tx}$$

where $H_{eff} = H_{nse}^{-1} H_{sig}$ as before. Since $\vec{C}_{tx}$ represents the known ideal constellation encoded at the transmitter, one method for calculating the effective PDL matrix is to evaluate $$H_{eff} = \left[\sum_{k=1}^{M} \vec{C}_L[k]\vec{C}_{tx}^H[k]\right]\left[\sum_{k=1}^{M} \vec{C}_{tx}[k]\vec{C}_{tx}^H[k]\right]^{-1}$$

However, the accuracy of $H_{eff}$ may be improved by instead calculating the error field vector $$\vec{e} = \vec{r}_w - \vec{s}_L$$

in which $\vec{s}_L$ is a nominally error free estimate of the transmit symbol constructed by mapping the error-free transmit bit sequence to symbols using the learned constellation $\vec{C}_L$. Notice that if $\vec{s}_L$ is instead replaced with a hard decision estimate of the received symbols relative to the learned constellation, the error field vector $\vec{e}$ will contain contributions from symbol decision errors that will degrade the estimated effective PDL. Assuming that the transmit symbols are normalized according to $E\{\vec{s}\vec{s}^H\} = \frac{1}{2}I$, it is observed that $H_{eff}$ can be calculated from the correlation matrix $$\hat{C}_w = E\{\vec{r}_w \vec{r}_w^H\} - \frac{1}{2}E\{|\vec{e}|^2\}I$$

by noting that $\hat{C}_w \propto H_{eff}H_{eff}^H$ In particular, the magnitude of the effective channel PDL is $$pdl_e = \frac{1}{2} 10 \cdot \left|\log_{10}\left(\frac{\lambda_1}{\lambda_2}\right)\right|$$

in which $\lambda_1$ and $\lambda_2$ are the two eigenvalues of the matrix $\hat{C}_w$.

As noted above, it is observed that decision errors affect the estimation of the effective PDL, $pdl_e$, through the inclusion of symbol decision errors in the error field vector $\vec{e}$. As shown in FIG. 1B, the impact of these decision errors is to cause a systematic offset between the estimated and actual PDL, together with an overall increase in the variance of the PDL measurement, as reflected by scatter about the mean value. However, if the error-free reconstruction of the transmit symbols are used in place of a hard-decision estimate, the contribution due to symbol decision errors in $\vec{e}$ is eliminated. In this case, as shown in FIG. 1B, the systematic offset between the estimated PDL and actual PDL is removed, and the variance of the estimate is reduced by a factor of ~4.

Figure 2:
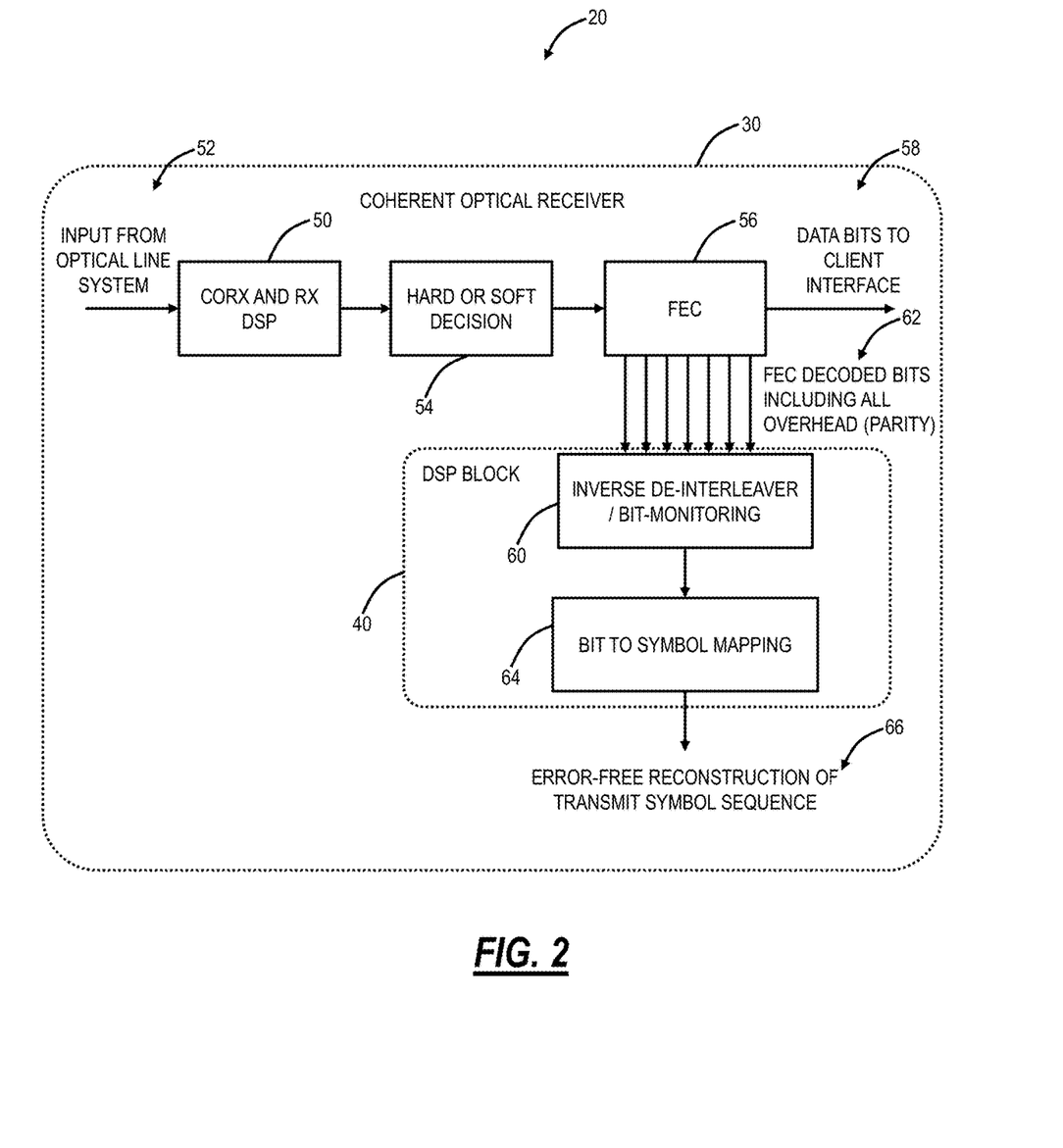
FIG. 2 is a block diagram of circuitry in a coherent receiver with error-free transmit signal reconstruction circuitry configured to perform a substantially error-free reconstruction of the transmit symbol sequence within the coherent receiver.

FIG. 2 is a block diagram of circuitry 20 in a coherent receiver 30 with error-free transmit signal reconstruction circuitry 40 configured to perform a substantially error-free reconstruction of the transmit symbol sequence within the coherent receiver 30. The coherent receiver 30 includes a DSP block 50 which includes optical components and electrical circuitry to receive an optical input 52 from an optical line system and convert the optical input 52 into an electrical signal. Those skilled in the art will recognize the coherent receiver and DSP block 50 can include various components which are omitted for illustration purposes. The optical input 52 can be a coherent optical signal, such as Quadrature Amplitude Modulation (QAM) or the like. Also, the optical input 52 can include Dual Polarization (e.g., X- and Y-polarizations). Generally, the optical input 52 includes symbols in sequence which are converted to bits, and the bits can include framing bytes, data bytes, overhead bytes, and parity for FEC. In typical coherent transmitters, the transmit bit sequence is temporally reordered, or "bit interleaved", prior to transmission to reduce any temporal correlations between received symbols. This transmit bit interleaving can improve FEC performance in the presence of temporally correlated noise or distortion, for example, nonlinear noise developed during fiber propagation. Note that this transmit bit interleaving is a deterministic one-to-one mapping between the original bit sequence and the temporally reordered bits that is inverted at the coherent receiver to recover the original bit sequence prior to FEC decoding. This inversion will be referred to as receiver bit deinterleaving. Note, while the coherent receiver 30 is described herein is illustrated as a coherent optical receiver, those skilled in the art will recognize other types of coherent receivers are also contemplated by the systems and methods described herein, such as wireless.

The optical input 52 is transmitted from a corresponding transmitter, and the actual transmitted signal (including all symbols in sequence) is typically corrupted based on the transmission over the optical fiber. The electrical output of the coherent receiver and DSP block 50 is provided to a hard or soft decision block 54 which performs decoding based on the corrupted optical input 52. The output of the hard or soft decision block 54 is a digital data stream which is an estimate of the actual transmitted signal with errors introduced based on transmission over the optical channel. As noted herein, conventional measurement methods use this estimate of the actual transmitted signal for measurements. While this is close, the residual errors between the estimated and actual transmitted signal cause discrepancies in the real-time measurements when using the estimate.

An FEC decoding block 56 receives the digital data from the hard or soft decision block 54 and performs FEC decoding. The FEC decoding scheme can be any technique including Hard Decision FEC (HD-FEC), Soft Decision FEC (SD-FEC), and the like. Further, the FEC decoding scheme may also involve sequential FEC decoding, wherein bits decoded in previous FEC iterations may be used to improve the decoding of bits in later FEC iterations. In other embodiments, the FEC decoding scheme may involve two or more FEC decoders operating in parallel, wherein the bits include a received optical symbol having different average bit error probabilities (BEP) are segregated and processed by FEC decoders with different code rates optimized for particular average BEP values. Bits decoded in one or more of the parallel FEC decoders may then be used to improve the decoding of bits in the other FEC decoders. Clearly, other embodiments may combine iterative decoding with parallel FEC decoding, in which case bits decoded in previous FEC iterations of one or more parallel FEC decoders may be used to improve the decoding of bits in later FEC iterations in one or more of the other parallel decoders. Of note, the FEC decoding scheme, as well as any transmit bit interleaving, is known a priori between the transmitter and the coherent receiver 30. An output of the FEC decoding block 56 is data bits 58 which are provided to a client interface (e.g., a switch module, a client transceiver, etc.). The data bits 58 are error free for the typical case in which the FEC has converged in the normal mode of operation.

In various exemplary embodiments, the coherent receiver 30 is configured to perform an error-free reconstruction of the transmitted signal via the reconstruction circuitry 40. The reconstruction circuitry 40 can be a DSP block communicatively coupled to or part of the FEC decoding block 56. Since the receiver bit deinterleaving is a known and deterministic mapping, the reconstruction circuitry 40 monitors ("sniffs") the known location of bits in the deinterleaved bit sequence at the output of FEC corresponding to the desired bits at the input of the deinterleaver. In one embodiment, the reconstruction circuitry 40 may include a deinterleaver block 60 configured to receive all FEC decoded bits 62 from the FEC decoding block 56 with all overhead (i.e., FEC parity bits). In another embodiment, the reconstruction circuitry may include a deinterleaver block configured to receive FEC decoded bits from the FEC decoding block for symbols known to contain only information bits without parity. The output of the deinterleaver block 60 is then a digital data stream corresponding to the desired interleaved bit stream. This is based on the FEC decoding block 56 removing any errors. The reconstruction circuitry 40 further includes a bit-to-symbol mapping block 64 which converts the interleaved bit stream into the associated transmitted symbols. An output 66 of the bit-to-symbol mapping block 64 is an error-free reconstruction of the transmit symbol sequence. The output 66 can be used in various measurements of system performance uncorrupted by receive decision errors.

In other embodiments, the transmitted optical spectrum may be subdivided into multiple subcarriers either through digital modulation, referred to here as frequency division multiplexed (FDM) subcarriers, or alternatively using multiple optical subcarriers. The coherent receiver may then be configured to process these multiple (digitally or optically modulated) subcarriers in parallel, and subsequently decoding the received symbols of the various subcarriers in one or more FEC decoders. For example, the optical symbols from all subcarriers may be aggregated and decoded by a single FEC decoding block. Alternatively, optical symbols from a single subcarrier may be processed by an FEC decoding block dedicated to the subcarrier. The output of the FEC decoding block(s) may be monitored for one or more of the subcarriers to provide a nominally error-free representation of the transmit symbol sequence for one or more of the subcarriers.

In an exemplary embodiment, the coherent receiver 30 is configured to estimate a transmit symbol sequence and the coherent receiver 30 includes the FEC decoding block 56 configured to decode an input to provide a nominally error-free information bit sequence; the deinterleaver block 60 configured to reorder the nominally error-free information bit sequence to provide a nominally error-free estimate of the transmitted bit sequence; and the bit-to-symbol mapping block 64 configured to map the transmitted bit sequence to transmit symbols. The FEC decoding block 56 can be connected to the deinterleaver block 60 to provide overhead bits and decoded data bits to determine the transmitted bit sequence; although it is also possible to re-compute the overhead bits.

Figure 3:
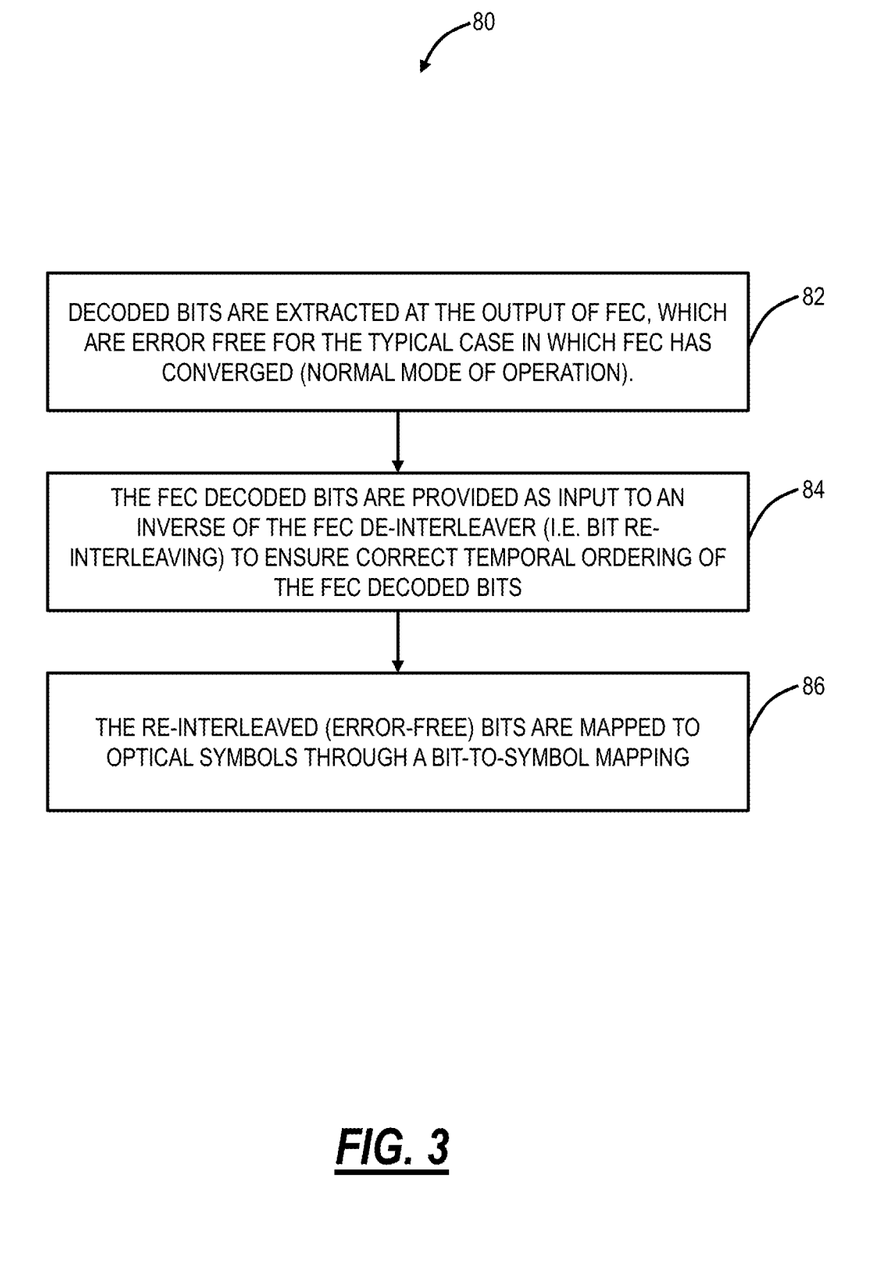
FIG. 3 is a flowchart of an error-free reconstruction process implemented by the error-free transmit signal reconstruction circuitry in the coherent receiver of FIG. 2.

FIG. 3 is a flowchart of an error-free reconstruction process 80 implemented by the error-free transmit signal reconstruction circuitry 40. First, the decoded bits 62 are extracted at the output of the FEC decoding block 56, which are error free for the typical case in which FEC has converged (normal mode of operation) (step 82).

The FEC decoded bits 62 are provided as input to an inverse of the FEC deinterleaver (i.e., bit re-interleaving) (at the inverse deinterleaver block 60) to ensure correct temporal ordering of the FEC decoded bits (step 84). Note that without this step 84, the FEC bits are de-interleaved in time and cannot be mapped directly to the correct transmit optical symbols. As noted above, in a preferred implementation the bits are sniffed at known locations to avoid having to implement bit deinterleaver 60.

The re-interleaved (error-free) bits are mapped to optical symbols through a bit-to-symbol mapping (step 86). This provides functionality similar to a constellation look-up-table in standard transmitter ASIC implementations. These optical symbols represent an error-free reconstruction of the transmit symbol record, i.e., the output 66.

In another exemplary implementation, the FEC parity/overhead bits can be recomputed, either in the ASIC or firmware, based only upon the FEC-decoded information bits. In some applications, the parity may be calculated across several different FEC blocks, making the reconstruction of the FEC parity difficult. In this case, direct access to the FEC parity bits through additional wiring may be preferable. As noted above, some embodiments may sniff bits associated with symbols that are known to contain only information bits without parity.

The output 66 represents a nominally error-free reconstruction of the transmit symbol sequence, and this can be used with the optical input 52 to provide various real-time measurements as described herein such as SNR, etc.

As the output 66 is used for real-time measurements, the reconstruction circuitry 40 and the reconstruction process 80 can operate on a reduced cadence, i.e., not continuously in time, to reduce the power consumption of the additional hardware associated with re-interleaving and bit-to-symbol-mapping. For example, the bursts of transmit optical symbols can be reconstructed every T seconds, where T can be chosen sufficiently less than the timescale of change of the object of the measurement to allow accurate tracking.

The error-free reconstruction of the transmit symbol record, i.e., the output 66, together with the optical symbols as received by the coherent receiver, i.e., the optical input 52, may be provided to other DSP blocks within the coherent receiver 30, to firmware, or to higher software layers for further processing. Note that the "received optical symbols" may be measured at the input or output of any DSP block in the ASIC as appropriate. This can be of use both for diagnostics of ASIC performance, as well as for training of DSP ASIC parameters.

Note that in some applications, the bit-to-symbol mapping may be implemented in either firmware or other software layers, including external processing units communicatively coupled to the coherent receiver 30. That is, in this case, the FEC decoded bit sequence would be provided to the firmware (or appropriate software), and the optical symbol sequence would be reconstructed as appropriate.

Advantageously, having the output 66 as an error-free reconstruction of the transmit optical signals at the coherent receiver 30 provides real-time system measurement capabilities that are either difficult, not accurate or not feasible with current approaches using the estimated transmit signal. The reconstruction circuitry 40 and the reconstruction process 80 "instrumentizes" the coherent receiver 30 in the sense that accurate, real-time link measurements can be provided to either DSP algorithms within the coherent receiver 30, higher layers of network control, or to outside users through appropriate Application Programming Interfaces (APIs).

Figure 4:
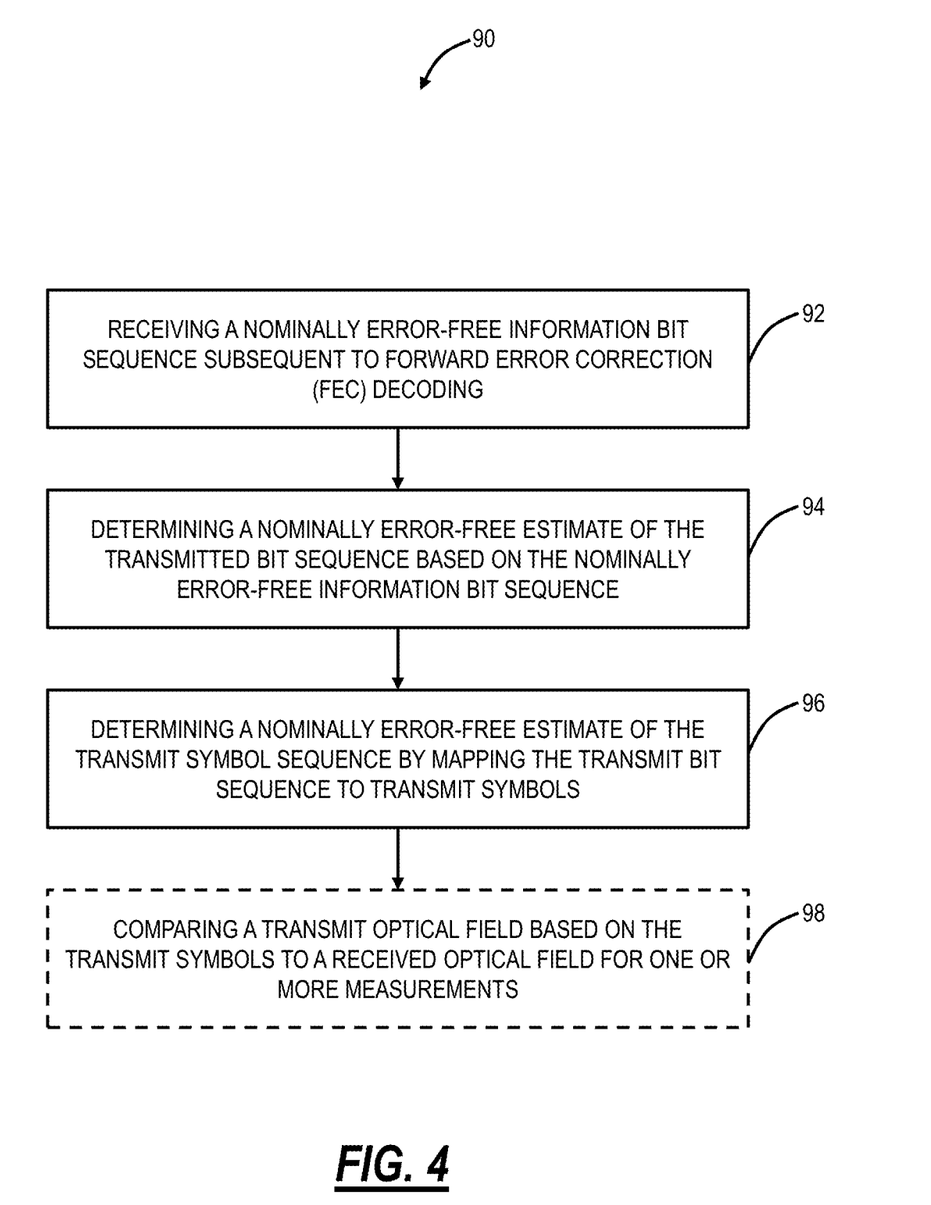
FIG. 4 is a flowchart of a process to estimate a transmit symbol sequence based on real-time monitoring of the output of Forward Error Correction (FEC) after detection.

FIG. 4 is a flowchart of a process 90 to estimate a transmit symbol sequence based on real-time monitoring of the output of Forward Error Correction (FEC) after detection. The process 90 also contemplates operation in the coherent receiver 30 such as through the reconstruction circuitry 40. The process 90 includes receiving a nominally error-free information bit sequence subsequent to Forward Error Correction (FEC) decoding (step 92); determining a nominally error-free estimate of the transmitted bit sequence based on the nominally error-free information bit sequence (step 94); and determining a nominally error-free estimate of the transmit symbol sequence by mapping the transmit bit sequence to transmit symbols (step 96).

The process 90 can further include comparing a transmit optical field based on the transmit symbols to a received optical field for one or more measurements (step 98). The transmit optical field can be derived from the transmit symbols. The received optical field can be determined at various points in the coherent receiver 30 and can be compared to the transmit optical field for a variety of measurements.

The comparing step 98 can estimate signal impairments originating in one or more of a coherent transmitter, the coherent receiver, and an optical channel between the coherent transmitter and the coherent receiver. Often the comparing can also localize cause impairments within a coherent transmitter, the coherent receiver, and an optical channel between the coherent transmitter and the coherent receiver. The reconstruction circuitry 40 and the processes 80, 90 allow the ability to make measurements in the coherent receiver 30 without coordinating with the transmitter. The one or more measurements can be used for several applications including dynamic learning of the C-matrix for nonlinear pre-compensation, on-the-fly training of carrier recovery and soft-decoder parameters in the receive DSP, improved measurement of Polarization Mode Dispersion (PMD) and Polarization Dependent Loss (PDL), as well as for the separation of Amplified Stimulated Emission (ASE) and nonlinear noises. In principle, the receive optical symbols can be queried from any point in the receive DSP, not just at the input to the hard or soft decision block 54, providing diagnostics of DSP performance for lab testing.

The determining the nominally error-free estimate of the transmitted bit sequence step 94 can include reinserting overhead bits associated with the FEC decoding into the error-free information bit sequence. The overhead bits can be determined based on connectivity from the FEC decoding block 56 which provides the overhead bits. The overhead bits can also be determined on re-computing the overhead bits from the transmitted bit sequence. This reconstruction of the transmitted bit sequence does require knowledge of the de-interleaver mapping, as well as reinsertion of any overhead bits that are otherwise removed during the FEC decoding.

The determining the nominally error-free estimate of the transmitted bit sequence step 94 can include reordering in time of the nominally error-free information bit sequence as an inverse of any bit interleaving at a corresponding transmitter. The reordering in time can be based on a deterministic mapping and is implemented by monitoring known bit locations and using a series of multiplexers. Since the de-interleaver is a deterministic mapping (i.e., the coherent receiver 30 knows a priori the interleaving performed by a corresponding transmitter), the location of bits within the de-interleaved line frame originating from a particular burst is known. In an exemplary embodiment, it is possible to monitor these known bit locations as opposed to implementing a full re-interleaver within the reconstruction circuitry 40. The hardware complexity of this feature is low since this bit-monitoring requires mainly a series of multiplexers. The bit-monitoring locations in the line frame do depend on capacity, so the reconstruction circuitry 40 can support unique monitoring locations for each client rate.

The process 90 estimation can be applied to a portion of an input to the coherent receiver 30 to periodically sniff (monitor) a plurality of symbols for one or more measurements. Of course, the process 90 can be applied to the entire data stream associated with the optical input 52. However, this approach may be hardware intensive and not necessary for periodic measurements. Thus, the process 90 can periodically sniff data burst of M dual polarization optical symbols at the output of the FEC decoding block 56. In this case, memory is only required to buffer one burst of received optical symbols at multi-bit resolution at the input of the soft decoder together with the reconstructed transmit optical symbols. The rate at which bursts can be sniffed is then limited by how quickly this memory can be copied from the reconstruction circuitry 40 to a processor on the coherent receiver 30 (e.g., an ARM processor) for firmware access. In an exemplary embodiment, the process 90 can sniff a burst of M 550 dual polarization optical symbols every ~5 μs; although other embodiments are also contemplated.

Note, while all of the techniques described herein have been described with reference to the coherent receiver 30 and the reconstruction circuitry 40 therein, other embodiments are also contemplated. For example, the transmit symbols can be provided to an external processing unit along with the received symbols for processing thereof. Also, the portions of the processes 80. 90 can be implemented in an external processing unit communicatively coupled to the coherent receiver 30. Further, results of the comparisons or measurements can be provided to network level controllers or the like to implement network-layer algorithms to optimize optical network performance.

In another exemplary embodiment, the process 90 can be implemented via circuitry including circuitry configured to receive a nominally error-free information bit sequence subsequent to Forward Error Correction (FEC) decoding; circuitry configured to determine a nominally error-free estimate of the transmitted bit sequence based on the nominally error-free information bit sequence; and circuitry configured to determine a nominally error-free estimate of the transmit symbol sequence by mapping the transmit bit sequence to transmit symbols.

Also, it will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for estimating a transmit symbol sequence implemented in a coherent receiver, the method comprising:
    receiving a nominally error-free information bit sequence subsequent to Forward Error Correction (FEC) decoding;
    determining a nominally error-free estimate of a transmitted bit sequence based on the nominally error-free information bit sequence; and
    determining a nominally error-free estimate of the transmit symbol sequence by mapping the nominally error-free estimate of the transmitted bit sequence to transmit symbols, wherein the nominally error-free estimate of the transmit symbol sequence was transmitted by a corresponding coherent transmitter over a channel to the coherent receiver.

2. The method of claim 1, further comprising
    comparing a transmit optical field based on the nominally error-free estimate of the transmit symbol sequence to a received optical field for one or more measurements.

3. The method of claim 2, wherein the comparing estimates signal impairments originating in one or more of the corresponding coherent transmitter, the coherent receiver, and the channel.

4. The method of claim 3, wherein a cause of the impairment is localized within one or more of the corresponding coherent transmitter, the coherent receiver, and the channel.

5. The method of claim 1, wherein the determining the nominally error-free estimate of the transmitted bit sequence comprises reinserting overhead bits associated with the FEC decoding into the nominally error-free information bit sequence.

6. The method of claim 5, wherein the overhead bits are determined based on connectivity from an FEC decoding block which provides the overhead bits.

7. The method of claim 5, wherein the overhead bits are determined on re-computing the overhead bits from the transmitted bit sequence.

8. The method of claim 1, wherein the determining the nominally error-free estimate of the transmitted bit sequence comprises
temporally reordering the nominally error-free information bit sequence as an inverse of any bit interleaving at the corresponding transmitter.

9. The method of claim 1, wherein the estimating is applied to a portion of an input to the coherent receiver to periodically monitor a plurality of symbols for one or more measurements.

10. The method of claim 1, further comprising
utilizing the nominally error-free estimate of the transmit symbol sequence to determine nonlinear C-matrices characterizing Kerr nonlinearity developed during fiber propagation.

11. The method of claim 1, further comprising
utilizing the nominally error-free estimate of the transmit symbol sequence to determine effective Polarization Dependent Loss (PDL) for link performance monitoring.

12. The method of claim 1, further comprising
utilizing the nominally error-free estimate of the transmit symbol sequence to determine the average receive symbol constellation.

13. An apparatus configured to estimate a transmit symbol sequence implemented in a coherent receiver, the apparatus comprising:
circuitry configured to receive a nominally error-free information bit sequence subsequent to Forward Error Correction (FEC) decoding;
circuitry configured to determine a nominally error-free estimate of a transmitted bit sequence based on the nominally error-free information bit sequence; and
circuitry configured to determine a nominally error-free estimate of the nominally error-free estimate of the transmit symbol sequence by mapping the transmitted bit sequence to transmit symbols, wherein the nominally error-free estimate of the transmit symbol sequence was transmitted by a corresponding coherent transmitter over a channel to the coherent receiver.

14. The apparatus of claim 13, further comprising
circuitry configured to compare a transmit optical field based on the nominally error-free estimate of the transmit symbol sequence to a received optical field for one or more measurements.

15. The apparatus of claim 14, wherein the circuitry configured to compare estimates signal impairments originating in one or more of the corresponding coherent transmitter, the coherent receiver, and the channel.

16. The apparatus of claim 15, wherein a cause of the impairment is localized within one or more of the corresponding coherent transmitter, the coherent receiver, and the channel.

17. The apparatus of claim 13, wherein the circuitry configured to determine the nominally error-free estimate of the transmitted bit sequence is configured to
reinsert overhead bits associated with the FEC decoding into the nominally error-free information bit sequence.

18. The apparatus of claim 17, wherein the overhead bits are provided from an FEC decoding block which performs the FEC decoding.

19. The apparatus of claim 17, wherein the circuitry configured to determine the nominally error-free estimate of the transmitted bit sequence is configured to re-compute the overhead bits based on the transmitted bit sequence.

20. A coherent receiver configured to estimate a transmit symbol sequence, the coherent receiver comprising:
a Forward Error Correction (FEC) decoding block configured to decode an input to provide a nominally error-free information bit sequence;
a bit-monitor configured to monitor the nominally error-free information bit sequence to provide a nominally error-free estimate of a transmitted bit sequence; and
a bit-to-symbol mapping block configured to map the nominally error-free estimate of the transmitted bit sequence to transmit symbols for a nominally error-free estimate of the transmit symbol sequence, wherein the nominally error-free estimate of the transmit symbol sequence was transmitted by a corresponding coherent transmitter over a channel to the coherent receiver.

* * * * *